United States Patent
Cui et al.

(10) Patent No.: US 9,333,578 B2
(45) Date of Patent: May 10, 2016

(54) FIBER REINFORCED BRAZED COMPONENTS AND METHODS

(71) Applicant: General Electric Company, Schenectady, NY (US)

(72) Inventors: Yan Cui, Greer, SC (US); Srikanth Chandrudu Kottilingam, Simpsonville, SC (US); Jason Robert Parolini, Greer, SC (US); Dechao Lin, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/318,934

(22) Filed: Jun. 30, 2014

(65) Prior Publication Data
US 2015/0375321 A1 Dec. 31, 2015

(51) Int. Cl.
*B23K 1/00* (2006.01)
*B23K 1/19* (2006.01)
*B32B 5/02* (2006.01)

(52) U.S. Cl.
CPC .............. *B23K 1/0008* (2013.01); *B23K 1/0018* (2013.01); *B23K 1/19* (2013.01); *B32B 5/02* (2013.01); *B23K 2201/001* (2013.01); *B23K 2203/16* (2013.01); *B32B 2262/106* (2013.01); *B32B 2264/105* (2013.01); *B32B 2313/04* (2013.01); *B32B 2603/00* (2013.01); *B32B 2605/00* (2013.01)

(58) Field of Classification Search
USPC ................................ 156/182, 276; 228/122.1
See application file for complete search history.

(56) References Cited

U.S. PATENT DOCUMENTS

| | | | | |
|---|---|---|---|---|
| 3,097,931 A * | 7/1963 | Davidson | .............. | C04B 35/645 228/121 |
| 3,609,856 A * | 10/1971 | Eckart | .................. | B23K 35/327 228/121 |
| 3,717,926 A * | 2/1973 | Anikin | .................. | C04B 37/006 228/121 |
| 3,720,257 A * | 3/1973 | Beutler | .................... | C22C 49/14 164/100 |
| 4,398,659 A * | 8/1983 | Richter | .................. | B23K 15/08 156/182 |
| 4,990,402 A * | 2/1991 | Kneringer | ................ | B23K 1/19 228/122.1 |
| 5,023,043 A * | 6/1991 | Kotzlowski | ........... | F16L 59/028 228/122.1 |
| 5,410,133 A * | 4/1995 | Matsen | .................. | B21D 26/02 219/615 |
| 5,495,979 A | 3/1996 | Sastri et al. | | |
| 5,580,670 A * | 12/1996 | Grill | .................... | B23K 35/001 428/610 |

(Continued)

FOREIGN PATENT DOCUMENTS

EP 0221647 A1 5/1987
EP 2620594 A1 7/2013

(Continued)

OTHER PUBLICATIONS

A European Search Report and Opinion issued in connection with corresponding EP Application No. 15174153.5 on Dec. 1, 2015.

*Primary Examiner* — Archene Turner
(74) *Attorney, Agent, or Firm* — Ernest G. Cusick; Frank A. Landgraff

(57) ABSTRACT

Methods of providing a fiber reinforced braze include providing a substrate, disposing at least a first fiber reinforcement layer on the substrate, wherein the at least first fiber reinforcement layer comprises a fiber material, disposing at least a first braze layer on the at least first fiber reinforcement layer, wherein a melt temperature of the braze layer is lower than a melt temperature of the fiber material, and heating the at least first fiber reinforcement layer and the at least first braze layer to bond the fiber reinforced braze to the substrate.

15 Claims, 3 Drawing Sheets

(56) References Cited

U.S. PATENT DOCUMENTS

| | | | |
|---|---|---|---|
| 5,972,157 A * | 10/1999 | Xue | C04B 37/005 |
| | | | 156/182 |
| 7,318,547 B2 | 1/2008 | Gasse | |
| 7,846,506 B1 * | 12/2010 | Bhattacharya | C04B 41/009 |
| | | | 205/159 |
| 8,141,364 B2 | 3/2012 | Benoit et al. | |
| 8,161,753 B2 | 4/2012 | Benoit et al. | |
| 8,506,836 B2 | 8/2013 | Szuromi et al. | |
| 8,646,677 B2 * | 2/2014 | Beringer | B23K 1/0012 |
| | | | 228/122.1 |
| 2008/0131723 A1 | 6/2008 | Tucker et al. | |
| 2008/0190552 A1 | 8/2008 | Bouillon et al. | |
| 2013/0071562 A1 | 3/2013 | Szuromi et al. | |
| 2013/0149182 A1 | 6/2013 | Sreshta et al. | |
| 2013/0195673 A1 | 8/2013 | Godfrey et al. | |
| 2014/0126995 A1 | 5/2014 | Schick et al. | |
| 2014/0170433 A1 | 6/2014 | Schick et al. | |

FOREIGN PATENT DOCUMENTS

| | | |
|---|---|---|
| EP | 2570595 B1 | 10/2013 |
| WO | 2014071135 A1 | 5/2014 |

\* cited by examiner

FIBER REINFORCED BRAZED COMPONENTS AND METHODS

BACKGROUND OF THE INVENTION

The subject matter disclosed herein relates to brazed components and methods and, more specifically, to brazed components and methods with fiber reinforcement layers.

A wide variety of industry components may undergo a braze operation to add new material, modify existing material, modify the shape of a component, join multiple components together, or otherwise alter the original component. The braze operation may general comprise heating a filler metal above its melting temperature (i.e., above its liquidus temperature) while disposed on a base substrate (i.e., the original component) and subsequently cool the materials to join the filler metal and the base substrate together.

Various turbine components may, for example, undergo one or more braze cycles during original manufacture or modification pre or post utilization in a turbine. Some particular turbine components may also possess very high strength, toughness and/or other physical properties to facilitate sustained operation. Turbine components such as buckets (blades), nozzles (vanes), and other hot gas path components and combustions components of industrial and aircraft gas turbine engines may be formed of nickel, cobalt or iron-base superalloys with suitable mechanical and environmental properties.

In even some instances, because the efficiency of a turbomachine can be at least partially dependent on its operating temperatures, there may be a demand for components such as turbine buckets and nozzles to be capable of withstanding increasingly higher temperatures. As the maximum local temperature of a superalloy component approaches the melting temperature of the superalloy, forced air cooling may become necessary. For this reason, airfoils of gas turbine buckets and nozzles may include complex cooling schemes in which air, typically bleed air, is forced through internal cooling passages within the airfoil and then discharged through cooling holes at the airfoil surface to transfer heat from the component. Cooling holes can also be configured so that cooling air serves to film cool the surrounding surface of the component.

Components, including turbine components, that have undergone a braze cycle may thereby be reshaped, joined or otherwise modified into a suitable configuration. However, the brazed area may still be required to satisfy the same mechanical and environmental properties that the original substrate possessed. While brazing can incorporate a variety of material combinations, braze joints may generally be designed for shear loading applications. However, some components, including turbine components, that are potential candidates for braze modification may be subject to additional or alternative forces such as high tensile stress.

Accordingly, alternative fiber reinforced brazed components and methods would be welcome in the art.

BRIEF DESCRIPTION OF THE INVENTION

In one embodiment, a method of providing a fiber reinforced braze is disclosed. The method includes providing a substrate, disposing at least a first fiber reinforcement layer on the substrate, wherein the at least first fiber reinforcement layer comprises a fiber material, disposing at least a first braze layer on the at least first fiber reinforcement layer, wherein a melt temperature of the braze layer is lower than a melt temperature of the fiber material, and heating the at least first fiber reinforcement layer and the at least first braze layer to bond the fiber reinforced braze to the substrate.

In another embodiment, another method of providing a fiber reinforced braze is disclosed. The method includes providing a substrate, disposing at least a first braze layer on the substrate, disposing at least a first fiber reinforcement layer on the at least first braze layer, wherein the at least first fiber reinforcement layer comprises a fiber material, and wherein a melt temperature of the braze layer is lower than a melt temperature of the fiber material, and heating the at least first braze layer and the at least first fiber reinforcement layer to bond the fiber reinforced braze to the substrate.

In yet another embodiment, a fiber reinforced brazed component is disclosed. The fiber reinforced brazed component generally includes a substrate and a fiber reinforced braze bonded to the substrate. The fiber reinforced braze itself includes one or more braze layers and one or more fiber reinforcement layers each comprising a fiber material, wherein a melt temperature of each of the one or more braze layers is less than a melt temperature of the fiber material.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

Figure 1:
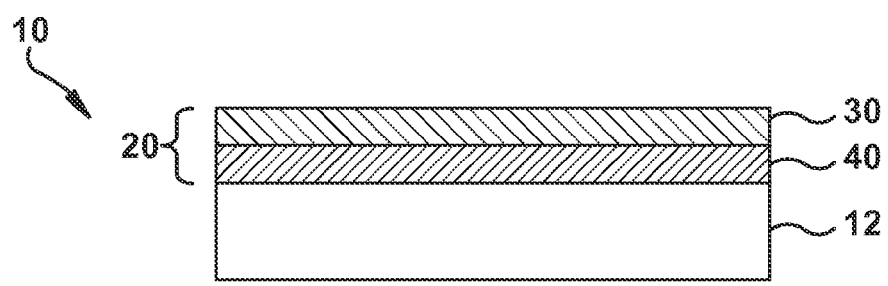
FIG. 1 is a cross-sectional view of a fiber reinforced brazed component according to one or more embodiments shown or described herein.
Figure 2:
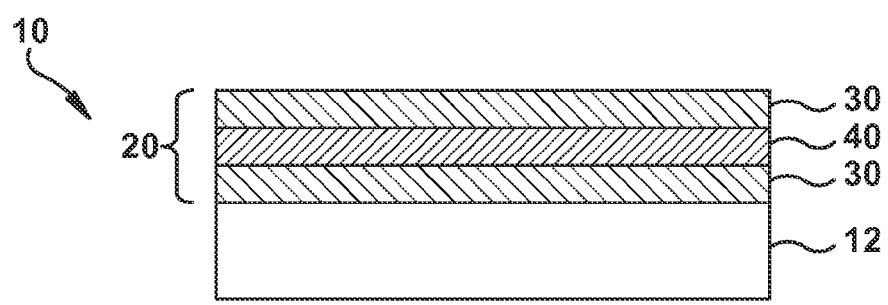
FIG. 2 is another cross-sectional view of a fiber reinforced brazed component according to one or more embodiments shown or described herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Referring now to FIGS. 1-5, fiber reinforced brazed components 10 disclosed herein generally comprise at least one substrate 12 and a fiber reinforced braze 20 bonded to the at least one substrate 12. The fiber reinforced braze 20 generally comprises one or more braze layers 30 and one or more fiber reinforcement layers 40. The fiber reinforcement layers 40 comprise a fiber material 45 that has a higher melt temperature than the one or more braze layers 30 such that the braze material can melt without melting the fiber material 45. Once heated and bonded to the at least one substrate 12, the fiber reinforced braze 20 comprises a mixture of braze and reinforcing fibers to provide additional strength. Moreover, as should be appreciated herein, the ordering, layering, orientation, configuration and the like of the braze layers 30 and the fiber reinforcement layers 40 may be tailored to accommodate a variety of specifications.

The fiber reinforced brazed component 10 can comprise any metal or alloy substrate suitable for a fiber reinforced braze application. Specifically, the present disclosure is generally applicable to any metal or alloy component that may be brazed, particularly those components that operate within environments characterized by relatively high stresses and/or temperatures. Notable examples of such components include turbine components such as turbine buckets (blades), nozzles (vanes), shrouds, and other hot gas path and combustion components of a turbine, such as an industrial gas or steam turbine or an aircraft gas turbine engine.

For example, in some embodiments, the substrate 12 may comprise a stainless steel such as 304 stainless steel. In some embodiments, the substrate 12 may comprise a nickel-, cobalt, or iron-based superalloys. For example, the substrate 12 may comprise nickel-based superalloys such as René N4, René N5, René 108, GTD-111®, GTD-222®, GTD-444®, IN-738 and MarM 247 or cobalt-based superalloys such as FSX-414. The substrate 12 may be formed as an equiaxed, directionally solidified (DS), or single crystal (SX) casting to withstand relatively higher temperatures and stresses such as may be present within a gas or steam turbine.

In some embodiments, the outer surface of the substrate 12 may be cleaned or otherwise prepared for the fiber reinforced braze application. For example, the substrate 12 may be cleaned by any suitable mechanical or chemical method such as a nicro-blast.

As stated above, the fiber reinforced brazed component 10 comprises a fiber reinforced braze 20 bonded to at least one substrate 12. The fiber reinforced braze 20 generally comprises one or more braze layers 30 and one or more fiber reinforcement layers 40, wherein the fiber reinforcement layers 40 comprise a fiber material 45 having a higher melt temperature than the braze layers 30. Once heated, the plurality of layers bond into a single fiber reinforced braze 20 bonded to the at least one substrate 12. As should be appreciated herein, the amount of respective layers, the order of relative layers, the orientation and thickness of different layers, and a variety of other parameters may be tailored to suit the application of the fiber reinforced brazed component 10.

Each of the fiber reinforcement layers 40 can comprise a fiber material 45 that may assist in reinforcing the overall fiber reinforced braze 20. Specifically, the fiber material 45 may comprise any fiber material that has a higher melt temperature than the one or more braze layers 30 such that when the fiber reinforced braze 20 is heated to bond with the at least one substrate 12, only the one or braze layers 30 melt.

In some embodiments, the fiber material 45 may be selected to provide increased strength or other physical characteristics for the fiber reinforced braze 20. For example, in some embodiments the fiber material 45 may comprise carbon fiber. Such embodiments may thereby provide a fiber material 45 with a melting temperature at or above 3,500° C. In some embodiments, the fiber material 45 may comprise silicon carbide fiber or any metal or alloy fiber. Furthermore, the fiber material 45 may comprise a variety of sizes and diameters that are suitable for placement within the fiber reinforced braze 20 of the fiber reinforced brazed component 10. For example, in some embodiments, the fiber material 45 may comprise a diameter that less than the thickness of the one or more braze layers 30. In other embodiments, the size, diameters or overall thicknesses of the fiber material(s) 45 and the respective fiber reinforcement layers 40 may vary throughout the overall fiber reinforced braze 20. In even some embodiments, the fiber material 45 may comprise hollow tubes. Such embodiments may facilitate additional functionality to the fiber reinforcement layers 40 of the fiber reinforced brazed component 10 such as by providing passageways (i.e., hollow tubes) for internal gas and/or fluid flow to assist in heating, cooling or the like.

The fiber material 45 may be disposed in a variety of configurations to form the fiber reinforcement layer 40. For example, in some embodiments, the fiber material 45 may be disposed in a unidirectional pattern. As used herein, "unidirectional pattern" comprises a plurality of fibers all being aligned in the same, substantially parallel, direction. In some embodiments, the fiber material 45 may be disposed in a multidirectional pattern. As used herein, "multidirectional pattern" comprises a plurality of fibers being disposed in a plurality of directions. For example, the fibers may be disposed in a bidirectional pattern such that some run in a first direction and some run in a second direction, different (e.g., perpendicular) to the first direction. Alternatively, the multidirectional pattern may comprise more than two different directions. In even some embodiments, multidirectional pattern may comprise a wide arrange of linear and/or non-linear fibers running in any of a variety of directions. It should be appreciated herein that the direction of the fiber material 45 may be selected based in part to facilitate increased strength or other physical characteristics of the fiber reinforced braze 20 of the fiber reinforced brazed component 10 in one or more orientations.

Still referring to FIGS. 1-5, the fiber reinforced braze 20 further comprises one or more braze layers 30. Each of the one or more braze layers 30 can comprise any braze material that has a melting temperature lower than that of the one or more fiber reinforcement layers 40 such that, when heated, only the braze layers 30 of the fiber reinforced braze 20 melt to bond the overall fiber reinforced braze 20 to the fiber reinforced brazed component 10. Such embodiments may thereby produce a resulting fiber reinforced braze 20 with one or more fiber reinforcement layers 40 intermixed with braze material such that the fiber material 45 can provide additional strength or other physical properties to the fiber reinforced brazed component 10 in one or more orientations.

In some embodiments, at least one of the one or more braze layers 30 may comprise one or more nickel-, cobalt-, or iron-based alloys. For example, at least one of the one or more braze layers 30 may comprise commercially available Amdry B-93 braze material, Amdry 788 braze material, or Amdry 805 braze material respectively. In some particular embodiments, at least one of the one or more braze layers 30 and the substrate 12 may share a common composition (i.e., they comprise the same type of material). The one or more braze layers 30 may further be provided in any suitable form such as, for example, tapes (e.g., flexible tapes), pastes, sheets, ingots, slurries, or the like or combinations thereof.

In some particular embodiments, at least one of the one or more braze layers 30 may comprise a pre-sintered preform. The pre-sintered preform comprises a mixture of particles comprising a base alloy and a second alloy that have been sintered together at a temperature below their melting points to form an agglomerate and somewhat porous mass. Suitable particle size ranges for the powder particles include 150 mesh, or even 325 mesh or smaller to promote rapid sintering of the particles and minimize porosity in the pre-sintered preform 30 to about 10 volume percent or less. In some embodiments, the density of the pre-sintered preform has a density of 90% or better. In even some embodiments, the pre-sintered preform has a density of 95% or better.

The base alloy of the pre-sintered preform can comprise any composition such as one similar to the substrate 12 to promote common physical properties between the pre-sintered preform of the fiber reinforced braze 20 and the substrate 12. For example, in some embodiments, the base alloy (of the pre-sintered preform) and the substrate 12 share a common composition (i.e., they are the same type of material). In some embodiments, the base alloy can comprise nickel-based superalloys such as René N4, René N5, René 108, GTD-111®, GTD-222®, GTD-444®, IN-738 and MarM 247 or cobalt-based superalloys such as FSX-414 as discussed above. In some embodiments, the properties for the base alloy include chemical and metallurgical compatibility with the substrate 12, such as high fatigue strength, low tendency for cracking, oxidation resistance and/or machinability.

In some embodiments, the base alloy may comprise a melting temperature of within about 25° C. of the melting temperature of the substrate 12. In some embodiments, the base alloy may comprise a compositional range of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance being nickel and incidental impurities. In even some embodiments, the base alloy may comprise a compositional range of, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities. It should be appreciated that while specific materials and compositions have been listed herein for the composition of the base alloy of the pre-sintered preform, these listed materials and compositions are exemplary only and non-limiting and other alloys may alternatively or additionally be used. Furthermore, it should be appreciated that the particular composition of the base alloy for the pre-sintered preform may depend on the composition of the substrate 12 and the relative melting temperature of the one or more fiber reinforcement layers 40.

As discussed above, the pre-sintered preform further comprises a second alloy. The second alloy may also have a composition similar to the substrate 12 but further contain a melting point depressant to promote sintering of the base alloy and the second alloy particles and enable bonding of the pre-sintered preform to the substrate 12 at temperatures below the melting point of the substrate 12 (and the one or more fiber reinforcement layers 40). For example, in some embodiments the melting point depressant can comprise boron and/or silicon.

In some embodiments, the second alloy may comprise a melting point of about 25° C. to about 50° C. below the grain growth or incipient melting temperature of the substrate 12. Such embodiments may better preserve the desired microstructure of the substrate 12 during the heating process. In some embodiments, the second alloy may comprise a compositional range of, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities. For example, in some embodiments the second alloy may comprise commercially available Amdry DF4B nickel brazing alloy. It should also be appreciated that while specific materials and compositions have been listed herein for the composition of the second alloy of the pre-sintered preform of the fiber reinforced braze 20, these listed materials and compositions are exemplary only and non-limiting and other alloys may alternatively or additionally be used. Furthermore, it should be appreciated that the particular composition of the second alloy for the pre-sintered preform may depend on the composition of the substrate and/or the fiber material 45 of the fiber reinforcement layer 40.

The pre-sintered preform can comprise any relative amounts of the base alloy and the second alloy that are sufficient to provide enough melting point depressant to ensure wetting and bonding (e.g., diffusion/brazing bonding) of the particles of the base alloy and the second alloy to each other and to the outer surface of the substrate 12. For example, in some embodiments the second alloy can comprise at least about 10 weight percent of the pre-sintered preform. In some embodiments the second alloy can comprise no more than 70 weight percent of the pre-sintered preform. Such embodiments may provide a sufficient amount of melting point depressant while limiting potential reduction of the mechanical and environmental properties of the subsequent heating. Furthermore, in these embodiments, the base alloy can comprise the remainder of the pre-sintered preform (e.g., between about 30 weight percent and about 70 weight percent of the pre-sintered preform). In even some embodiments, the particles of the base alloy can comprise about 40 weight percent to about 70 weight percent of the pre-sintered preform with the balance of the composition comprising particles of the second alloy. It should be appreciated that while specific relative ranges of the base alloy and the second alloy have been presented herein, these ranges are exemplary only and non-limiting and any other relative compositions may also be realized such that a sufficient amount of melting point depressant is provided as discussed above.

Aside from the particles of the base alloy and the second alloy, no other constituents may be required within the pre-sintered preform. However, in some embodiments, a binder may be initially blended with the particles of the base alloy and the second alloy to form a cohesive mass that can be more readily shaped prior to sintering. In such embodiments, the binder can include, for example, a binder commercially available under the name NICROBRAZ-S from the Wall Colmonoy Corporation. Other potentially suitable binders include NICROBRAZ 320, VITTA GEL from Vitta Corporation, and others including adhesives commercially available from Cotronics Corporation, all of which may volatilize cleanly during sintering.

The pre-sintered preform may be formed by mixing the powder particles of the base alloy (i.e., base alloy particles) and the second alloy (i.e., second alloy particles) by any suitable means such as stirring, shaking, rotating, folding or the like or combinations thereof. After mixing, the mixture may be combined with the binder (i.e., to form a combined powder mixture) and cast into shapes (i.e., to form a compacted preform), during and/or after which the binder can be burned off. The compacted preform may then be placed in a non-oxidizing (vacuum or inert gas) atmosphere furnace for the sintering operation, during which the powder particles of the base alloy and the second alloy undergo sintering to yield the pre-sintered preform with good structural strength and low porosity. Suitable sintering temperatures may at least in part depend on the particular compositions of the particles of the base alloy and the second alloy. For example, in some embodiments, the sintering temperature may be in a range of about 1010° C. to about 1280° C. In some embodiments, following sintering, the pre-sintered preform can be HIPed or vacuum pressed to achieve densities greater than 95%.

The one or more braze layers can comprise a variety of thicknesses and configurations depending on, for example, the type of fiber reinforced brazed component 10 and the type of material or materials making up the one or more braze layers 30. For example, in some embodiments, each of the braze layers 30 may comprise a substantially flat and solid layer of braze material. However, in some embodiments, one or more of the braze layers 30 may comprise one or more features to assist in the functionality or performance of the fiber reinforced brazed component 10.

For example, in some embodiments, such as when the fiber reinforced brazed component 10 comprises a turbine component and a braze layer 30 comprises a pre-sintered preform, the braze layer 30 may comprise one or more cooling channels 35 preformed therein. The cooling channel 35 can comprise any channel, passage, tube or the like that can facilitate the flow of one or more gas and/or liquids there through. For example, in some embodiments, the cooling channel 35 may comprise a width and depth of up to about 0.1 inch (about 2.5 mm), with a typical range of about 0.01 to about 0.05 inches (about 0.25 to about 1.27 mm), though lesser and greater widths and depths are possible. Furthermore, the cooling channel 35 can have any suitable cross-sectional area such as, for example, up to about 0.01 in$^2$ (about 6.5 mm$^2$), or from about 0.0001 to about 0.0025 in$^2$ (about 0.065 to about 1.6 mm$^2$).

Moreover, the cooling channel 35 may comprise a variety of cross-sectional shapes and configurations. For example, in some embodiments, such as that illustrated in FIG. 4, the cooling channel 35 may comprise a semi-circular tunnel. In other embodiments, the cross-sectional shape of the cooling channel 35 may be rectangular, circular, or any other geometrical or non-geometrical shape or combinations thereof. Furthermore, the cooling channel 35 can comprise a straight passage through the pre-sintered preform, or can comprise a multi-dimensional passage or passages such as a serpentine configuration. In some embodiments, the pre-sintered preform may comprise a single cooling channel 35. In other embodiments, such as that illustrated in FIG. 4, the pre-sintered preform may comprise a plurality of cooling channels 35. In even some embodiments, multiple cooling channels 35 may be interconnected to one another. The cooling channel 35 of the pre-sintered preform may also be aligned with one or more cooling holes or cooling channels within the substrate 12. Moreover, in some embodiments, the cooling channel 35 may be entirely disposed within the individual braze layer 30 comprising the pre-sintered preform. However, in some embodiments, the cooling channel 35 may be partially disposed in a plurality of braze layers 30 and/or the substrate 12 such as so two or more adjacent braze layers and/or the substrate 12 (and potentially even a fiber reinforcement layer 40) combine to form the cooling channel 35.

Referring back to FIGS. 1-4, the one or more braze layers 30 and the one or more fiber reinforcement layers 40 of the fiber reinforcement braze 20 can comprise a variety of configurations.

For example, in some embodiments, such as that illustrated in FIG. 1, the first layer of the fiber reinforced braze 20 (i.e., the first layer directly adjacent the substrate 12) may comprise a fiber reinforcement layer 40. In such embodiments, one or more braze layers 30 may then be disposed on top of the first fiber reinforcement layer 40. Alternatively, in some embodiments, such as that illustrated in FIG. 2, the first layer of the fiber reinforced braze 20 (i.e., the first layer directly adjacent the substrate 12) may comprise a braze layer 30. In such embodiments, one or more fiber reinforcement layers 40 may then be disposed on top of the first braze layer 30.

Figure 3:
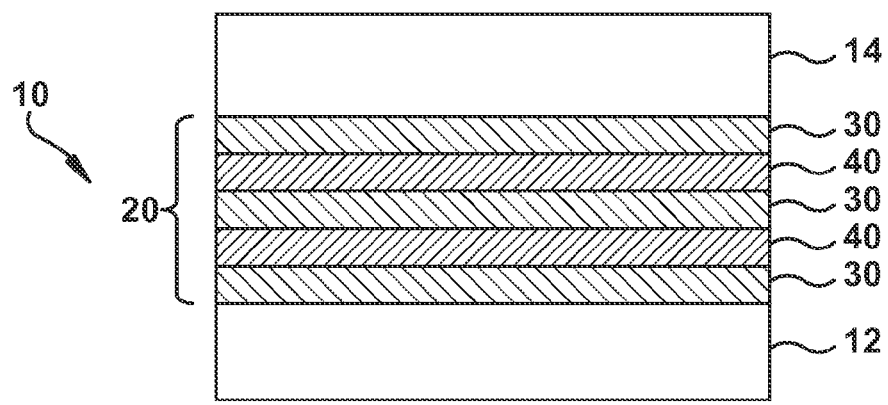
FIG. 3 is yet another cross-sectional view of a fiber reinforced brazed component according to one or more embodiments shown or described herein.
Figure 4:
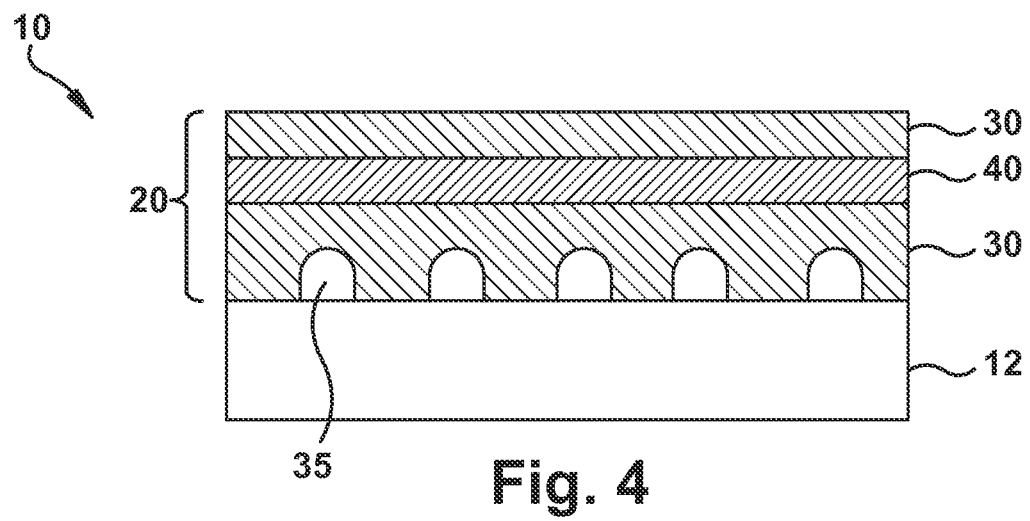
FIG. 4 is even yet another cross-sectional view of a fiber reinforced brazed component comprising cooling channels according to one or more embodiments shown or described herein.

In even some embodiments, the fiber reinforcement braze 20 may comprise multiple braze layers 30 and/or multiple fiber reinforcement layers 40. For example, as illustrated in FIG. 3, the fiber reinforcement braze 20 may comprise an alternating configuration of braze layers 30 and fiber reinforcement layers 40. However, in some embodiments, the fiber reinforcement braze 20 may comprise multiple braze layers 30 before a subsequent fiber reinforcement layer 40, or even multiple fiber reinforcement layers 40 before a subsequent braze layer 30. Furthermore, each of the one or more braze layers 30 and fiber reinforcement layers 40 can comprise the same, similar, different, varying or any other relative thicknesses. Accordingly, any suitable alternating, repeating or other varying layer system may be employed combining one or more braze layers 30 and one or more fiber reinforcement layers 40 to form the fiber reinforced braze 20.

In even some embodiments, the fiber reinforced braze 20 may be utilized to join a plurality of substrates together. Specifically, as the fiber reinforced braze 20 is heated, the one or more braze layers 30 melt to bond with each of the plurality of substrates to form a single fiber reinforced brazed component 10 that contains fiber material 45 (from the one or more fiber reinforcement layers 40) therein. For example, as illustrated in FIG. 3, the fiber reinforcement brace 20 may be disposed between a first substrate 12 and an additional substrate 14. It should be appreciated that the first substrate 12 and additional substrate 14 may independently be adjacent a braze layer 30 and/or a fiber reinforcement layer 40. In some embodiments, the first substrate 12 and the second substrate 14 may comprise the same type of material (such as when brazing to similar materials together to form a single fiber reinforced brazed component 10).

Figure 5:
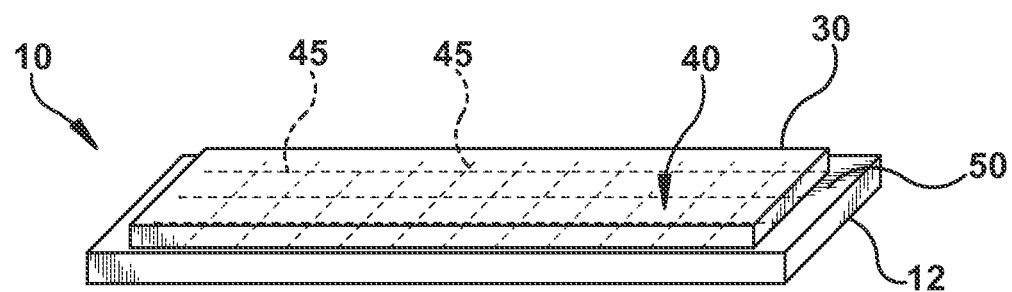
FIG. 5 is a perspective view of a fiber reinforced brazed component according to one or more embodiments shown or described herein.

As illustrated in FIG. 5, in some embodiments, an additional braze supplement 50 may be utilized to at least partially surround the fiber reinforced braze 20 prior to heating. The additional braze supplement 50 may comprise any additional material such as braze tape, braze paste, flux or the like to facilitate the melting of the one or more braze layers 30 and subsequent bonding to the substrate 12 and/or the protection of one or more parts of the fiber reinforced braze 20. For example, in some embodiments, a braze supplement 50 comprising commercially available BNi-9 paste may be disposed around the exterior of the braze layers 30 and the fiber reinforcement layers (and potentially all or parts of the one or more substrates 12) prior to heating. The braze supplement 50 may thereby assist in facilitating a quality melt and/or bond such as through limiting the oxidation of the incorporated materials.

Once the desired amount of one or more braze layers 30 and one or more fiber reinforcement layers 40 are disposed on the substrate 12, sufficient heat is applied to at least partially melt the one or more braze layers 30, without melting the one or more fiber reinforcement layers 40, so as to bond with the substrate 12 to form the fiber reinforced braze 20 on the fiber reinforced brazed component 10. The resulting fiber reinforced braze 20 can thereby comprise a substantially solidified braze material bonded with the substrate 12 with fiber material 45 dispersed therein. It should be appreciated due to the melting and re-solidification of the one or more braze layers 30, the resulting fiber reinforced braze 20 may not comprise the exact same layered structure the existed before heat applications. For example, if multiple braze layers 30 are sequentially disposed on top of one another, such braze layers 30 may substantially combine into a single braze layer 30 after heat application. Moreover, molten braze layers 30 may fill in any voids within or around the one or more fiber reinforcement layers 40 such that the interfaces between the or more braze layers 30 and the one or more fiber reinforcement layers 40 become blurred or difficult to define in the resulting fiber reinforced braze 20.

The temperature, heat source(s), iterations, ramp rate, hold time, cycle and any other relevant parameters of heat application can be adjusted so as to at least partially melt the one or more braze layers 30 without melting the one or more fiber reinforcement layers 40. For example, in some embodiments, heat may be applied within a non-oxidizing atmosphere (e.g., vacuum or inert gas). In some embodiments, such as when at least one of the one or more braze layers 30 comprises a pre-sintered preform, heat may be applied within a range of about 2050° F. to about 2336° F. (about 1120° C. to about 1280° C.), depending on composition, for a period of about 10 minutes to about 60 minutes.

Figure 6:
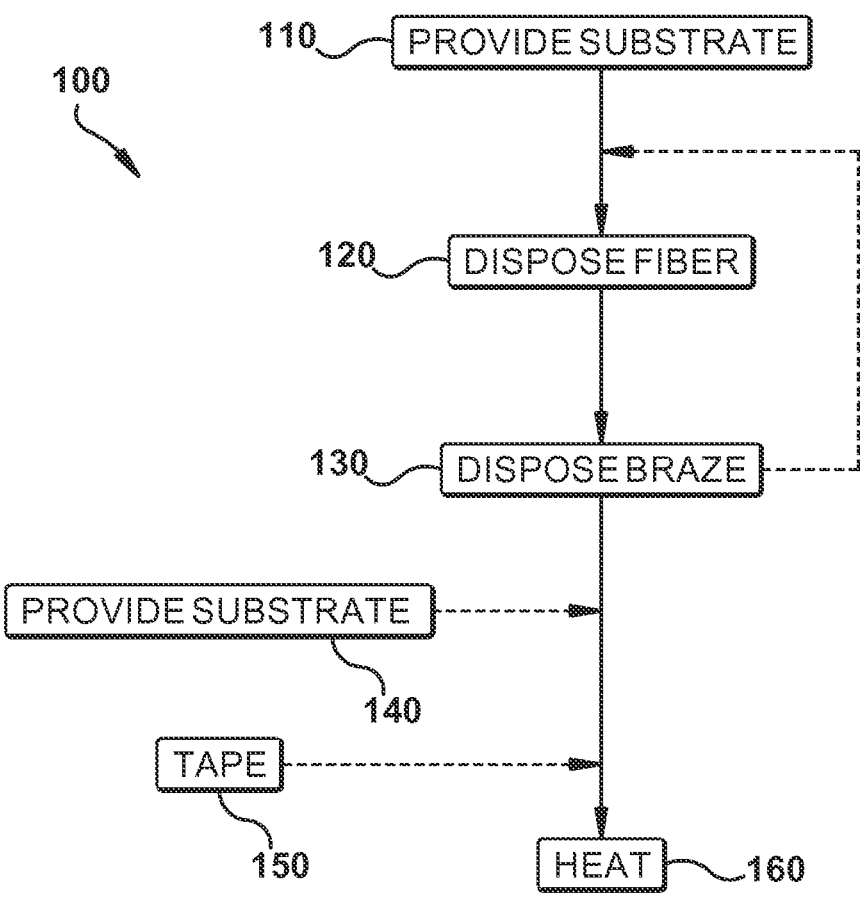
FIG. 6 is an exemplary method for providing a fiber reinforced braze according to one or more embodiments shown or described herein.

Referring now additionally to FIG. 6, an exemplary method 100 is illustrated for providing a fiber reinforced braze 20. The method 100 first comprises providing a substrate 12 in step 110. As discussed above, the substrate 12 can comprise any metal or alloy substrate suitable for a fiber reinforced braze application. For example, the substrate 12 may comprise a new or used turbine component or any other metal or alloy that can have a braze material melted thereon and bonded thereto. In some embodiments, providing the substrate 12 in step 110 may further comprise preparing at least a portion of the surface of the substrate 12 such as by mechanical or chemical cleaning.

The method 100 further comprises disposing at least a first fiber reinforcement layer 40 on the substrate 12 in step 120. Subsequently, the at least the first braze layer 30 can be disposed in step 130 on the at least first fiber reinforcement layer 40. However, as also discussed above, in some embodiments, the method 100 may alternatively comprise disposing at least a first braze layer 30 on the substrate 12 in step 130 prior to disposing the at least first fiber reinforcement layer 40 in step 120. In such embodiments, the at least first fiber reinforcement layer 40 will thereby be disposed on the at least first braze layer 30. The specific embodiment of the method 100 can depend on whether the fiber reinforced brazed component 10 should first have a fiber reinforcement layer 40 or a braze layer 30 adjacent the substrate 12. It should also be appreciated that "disposing on", "disposed on" and variations thereof as used herein further captures embodiments when one or more supplemental materials are inserted there between. For example, disposing the at least first fiber reinforcement layer 40 or the at least first braze layer 30 on the substrate 12 includes embodiments where a flux material or the like is already disposed on the substrate 12.

The method 100 further comprises any potential iteration of disposing additional fiber reinforcement layers 40 in step 120 and additional braze layers 30 in step 130. For example, fiber reinforcement layers 40 and braze layers 30 may be alternatingly disposed on top of one another in steps 120 and 130, or just one of the fiber reinforcement layers 40 or the braze layers 30 may be repeatedly disposed in step 120 or 130 respectively before the other type of layer is disposed. Method 100, and more specifically steps 120 and 130, may thereby continue in any applicable sequence to build the desired fiber reinforced braze 20.

In some embodiments, the method 100 may further comprise providing an additional substrate 14 adjacent at least one of the braze layers 30 or reinforcement layers 40 in step 140. Similar to the first substrate 12, the additional substrate 14 can also subsequently become bonded to the fiber reinforced braze 20 such that both substrates 12 and 14 become joined together. In even some embodiments, a braze supplement 50 may be applied to one or more portions of the at least first braze layer 30, the at least first fiber reinforcement layer 40, or the substrate 12 (or the additional substrate 14 if present) in step 150, prior to heating. As discussed above, the braze supplement 50 can comprise any additional material such as braze tape, braze paste, flux or the like to facilitate the melting of the one or more braze layers 30 and subsequent bonding to the substrate 12 (and/or additional substrate 14) and/or the protection of one or more parts of the fiber reinforced braze 20.

Finally, method 100 further comprises heating the at least first fiber reinforcement layer 40 and the at least first braze layer 30 in step 160 to bond the fiber reinforced braze 20 to the substrate 12 (and potentially the additional substrate 14). As discussed above, the temperature, heat source(s), iterations, ramp rate, hold time, cycle and any other relevant parameters of heat application in step 160 can be adjusted so as to at least partially melt the one or more braze layers 30 without melting the one or more fiber reinforcement layers 40 to bond the overall fiber reinforced braze 20 to the substrate 12 to produce a fiber reinforced brazed component 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A method of providing a fiber reinforced braze, the method comprising:
   providing a substrate;
   disposing at least a first fiber reinforcement layer on the substrate, wherein the at least first fiber reinforcement layer comprises a fiber material;
   disposing at least a first braze layer on the at least first fiber reinforcement layer, wherein a melt temperature of the braze layer is lower than a melt temperature of the fiber material, wherein at least one of the braze layers comprise a pre-sintered preform; and, heating the at least first fiber reinforcement layer and the at least first braze layer to bond the fiber reinforced braze to the substrate.

2. The method of claim 1, further comprising disposing at least one additional fiber reinforcement layer on the at least first braze layer prior to heating.

3. The method of claim 2, further comprising disposing at least one additional braze layer on the at least one additional fiber reinforcement layer prior to heating.

4. The method of claim 1, wherein the pre-sintered preform comprises one or more cooling channels.

5. The method of claim 1, wherein the fiber material comprises a carbon fiber.

6. The method of claim 1, further comprising disposing an additional substrate adjacent at least one of the fiber reinforcement layers or braze layers prior to heating.

7. The method of claim 1, wherein the fiber material comprises hollow tubes.

8. A method of providing a fiber reinforced braze, the method comprising:
   providing a substrate;
   disposing at least a first braze layer on the substrate, wherein at least one of the braze layers comprise a pre-sintered preform;
   disposing at least a first fiber reinforcement layer on the at least first braze layer, wherein the at least first fiber reinforcement layer comprises a fiber material, and wherein a melt temperature of the braze layer is lower than a melt temperature of the fiber material; and,
   heating the at least first braze layer and the at least first fiber reinforcement layer to bond the fiber reinforced braze to the substrate.

9. The method of claim 8, further comprising disposing at least one additional braze layer on the at least first fiber reinforcement layer prior to heating.

10. The method of claim 9, further comprising disposing at least one additional fiber reinforcement layer on the at least one additional braze layer prior to heating.

11. The method of claim 8, wherein the pre-sintered preform comprises one or more cooling channels.

12. The method of claim 8, wherein the fiber material comprises a carbon fiber.

13. The method of claim 8, further comprising disposing an additional substrate adjacent at least one of the fiber reinforcement layers or braze layers prior to heating.

14. The method of claim 8, wherein the fiber material comprises hollow tubes.

15. A method of providing a fiber reinforced braze, the method comprising:
   providing a substrate;
   disposing at least a first fiber reinforcement layer on the substrate, wherein the at least first fiber reinforcement layer comprises a fiber material, and wherein the fiber material comprises hollow tubes;
   disposing at least a first braze layer on the at least first fiber reinforcement layer, wherein a melt temperature of the braze layer is lower than a melt temperature of the fiber material; and,
   heating the at least first fiber reinforcement layer and the at least first braze layer to bond the fiber reinforced braze to the substrate.

\* \* \* \* \*